US006442654B1

United States Patent
Brock et al.

(10) Patent No.: US 6,442,654 B1
(45) Date of Patent: Aug. 27, 2002

(54) OPERATING SYSTEM SUPPORT FOR IN-SERVER CACHING OF DOCUMENTS

(75) Inventors: Bishop Chapman Brock; Eli Chiprout; Elmootazbellah Nabil Elnozahy; Ramakrishnan Rajamony; Freeman Leigh Rawson, III; Ronald Lynn Rockhold, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,406

(22) Filed: Dec. 10, 1999

(51) Int. Cl.[7] .............................................. G06F 12/00
(52) U.S. Cl. ....................... 711/141; 711/130; 711/144; 711/160
(58) Field of Search ................................ 711/141, 144, 711/130, 160

(56) References Cited

U.S. PATENT DOCUMENTS

| | | | |
|---|---|---|---|
| 4,887,204 A | * 12/1989 | Johnson et al. | 364/200 |
| 4,897,781 A | * 1/1990 | Chang et al. | 364/200 |
| 4,914,571 A | * 4/1990 | Baratz et al. | 364/200 |
| 5,644,751 A | * 7/1997 | Burnett | 395/440 |
| 5,734,898 A | * 3/1998 | He | 395/619 |
| 5,787,267 A | * 7/1998 | Leung et al. | 395/432 |
| 5,860,153 A | * 1/1999 | Matena et al. | 711/216 |
| 6,112,231 A | * 8/2000 | DeSimone et al. | 709/213 |
| 6,138,141 A | * 10/2000 | DeSimone et al. | 709/203 |
| 6,219,676 B1 | * 4/2001 | Reiner | 707/201 |

OTHER PUBLICATIONS

Wessels et al., "Internet Cache Protocol (ICP). Version 2," RFC2186, pp. 1–6, Network Working Group, Sep. 1997. http://faqs.org/rfcs/rfc2186.html.*
Wessels et al., "Application of Internet Cache Protocol (ICP), Version 2," RFC2187, pp. 1–24, Network Working Group, Sep. 1997. http://faqs.org/rfcs/rfc2187.html.*
Cao et al., "Maintaining Strong Cache Consistency in the World Wide Web," IEEE, pp. 445–457, Apr. 1998.*

* cited by examiner

*Primary Examiner*—Matthew Kim
*Assistant Examiner*—Stephen Elmore
(74) *Attorney, Agent, or Firm*—Casimer K. Salys; Bracewell & Patterson, L.L.P.

(57) ABSTRACT

A system and method for providing in-server caching of shared data involves a server program that defines a server cache in RAM of a server machine and stores a selected file in the server cache. If a cached file is modified through the file system interface of the operating system of the server machine, the operating system automatically issues an upcall to the server program, the upcall identifying the modified file. In response to receipt of the upcall, the server program removes the modified file from the server cache. In one embodiment, the server program responds to a client request requiring access to a requested file by obtaining the requested file from the server cache if the server cache contains that file. Otherwise, the server program calls the operating system to obtain the requested file and then adds that file to the server cache as a cached file. The server program then generates a result based on the requested file and transmits the result to the remote data processing system.

15 Claims, 4 Drawing Sheets

OPERATING SYSTEM SUPPORT FOR IN-SERVER CACHING OF DOCUMENTS

BACKGROUND OF THE INVENTION

1. Technical Field:

The present invention relates to data processing systems and, in particular, to collaborative data processing environments utilizing a client/server architecture. More particularly, the present invention relates to methods and systems for enhancing the performance of servers within client/server environments through caching.

2. Description of the Related Art:

The World Wide Web (Web) allows users of data-processing systems to retrieve vast amounts of electronic information via connections with remote server machines. This form of information dissemination is increasingly displacing more conventional media, such as newspapers, magazines, and even television. In the World Wide Web, clients obtain data by communicating with servers via the Internet—a combination of networks interconnected through routers and gateways. The clients and servers communicate using well-established protocols and standards for file exchange. For example, a standard for communication over the Internet consists of layering the Hypertext Transfer Protocol (HTTP) on top of the Transport Control Protocol/Internet Protocol combination (TCP/IP). Similarly, clients and servers exchange information in the form of well-established standards such as the Hypertext Markup Language (HTML) or the Portable Data Format (PDF), among many others.

Most interactions over the Internet today follow a client/server framework. Within that framework, the client is a process or program that requests a service provided by another program—the server. The client may utilize the requested service without having to "know" the working details of the server program or of the requested service itself. The client and the server typically execute on different data processing systems (i.e., on the client machine and on the server machine, respectively).

Web servers implement the server side of the aforementioned protocols and provide clients with high-performance, secure and reliable access to information over the Internet. For example, in a stock-quotation service, the client sends HTTP requests to the server over the Internet, identifying a particular stock name. The server retrieves the desired information from one or more associated storage devices and sends back an appropriate reply to the client over the network. The server is responsible for ensuring that the client is authorized to have access to the requested information and that the request, if legal, executes as rapidly as possible to ensure good response time. High performance, therefore, is an important aspect in the design and implementation of a Web server.

Many factors affect the performance of a Web server. These factors include network speed and efficient operation of the components of the Web server, such as the server-side protocol implementation.

The present invention recognizes that Web servers may improve performance by caching the frequently requested URL documents (i.e., documents that are retrievable via Uniform Resource Locators). In particular, according to the present invention a server sets aside a portion of its address space to serve as a cache for storing those documents (which may include, without limitation, textual documents, graphics, documents containing both text and graphics, multimedia presentations, Java® applets, etc.) Thus, when a client requests a document that is already in the cache, the server can send the required information directly from its own memory. The server may utilize standard techniques for managing the space inside the cache, including policies on how to allocate and reallocate storage.

The caching technique of the present invention improves the performance of the Web server by allowing the server to obtain data required to service client requests without having to access either the disk or the operating system. Without caching, the Web server would be required to retrieve the required files from the operating system, which might be required to access the disk, and both of those steps would cause delays and performance degradation. The caching technique of the present invention saves the server from the overhead of accessing the operating system layers that implement the file system structure. Traversing these layers involves several context switches, which degrade the performance of the server under heavy load.

Based on the foregoing, it can be appreciated that a need exists for a method and system that enables servers (such as Web servers) to cache served documents and to serve those documents while enabling the servers to avoid repeated queries to the operating system. The present invention provides such a method and system.

SUMMARY OF THE INVENTION

The present invention provides a system and method in which a server program defines a server cache in RAM of a server machine and stores a selected file in the server cache. If a cached file is modified through the file system interface of the operating system of the server machine, the operating system automatically executes issues an upcall to the server program, the upcall identifying the modified file. In response to receipt of the upcall, the server program removes the modified file from the server cache.

In one embodiment, the server program responds to a client request requiring access to a requested file by obtaining the requested file from the server cache if the server cache contains that file. Otherwise, the server program calls the operating system to obtain the requested file and then adds that file to the server cache as a cached file. The server program then generates a result based on the requested file and transmits the result to the remote data processing system.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use and further objects, and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1:
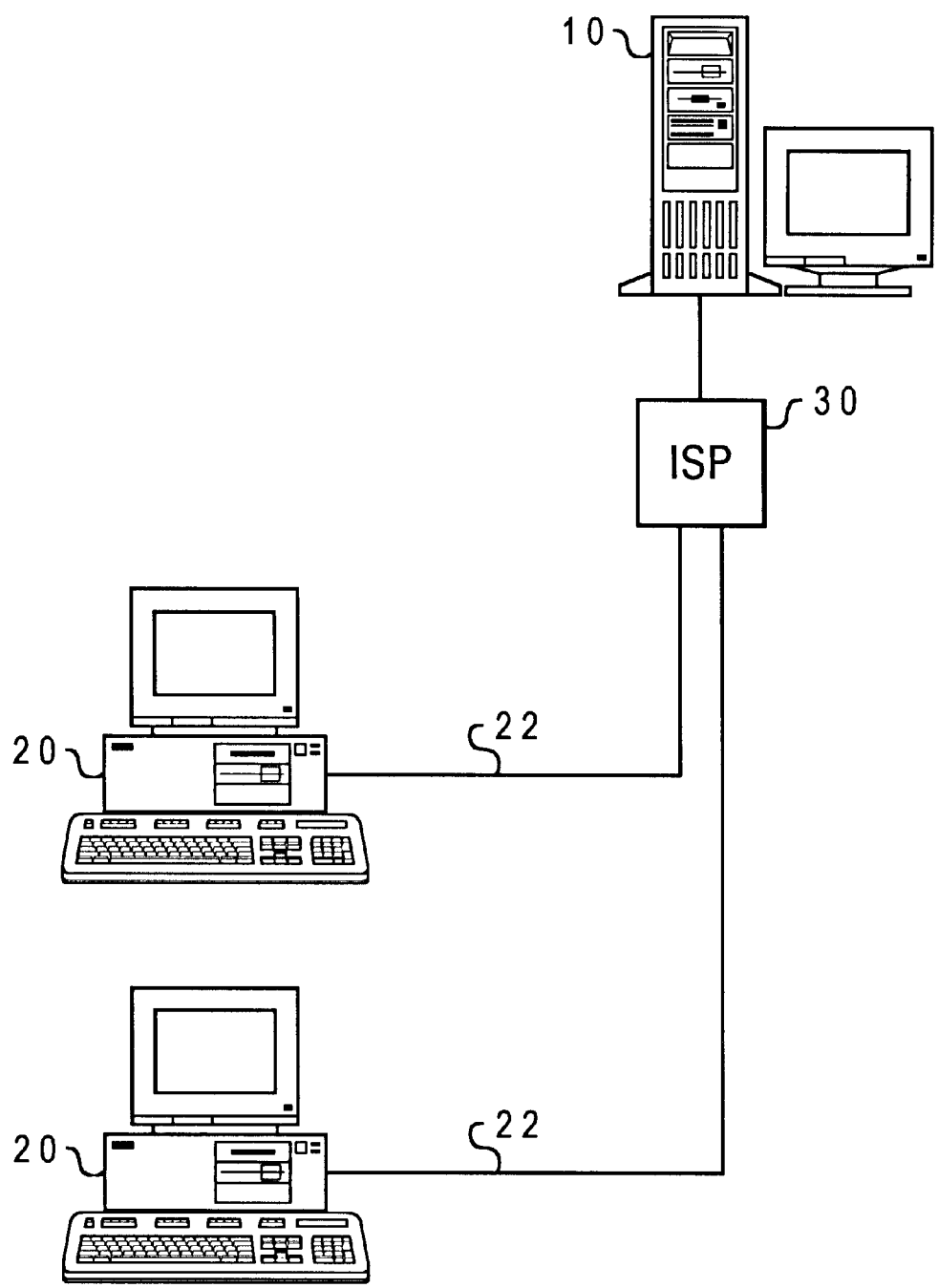
FIG. 1 depicts an illustrative collaborative data processing environment including an exemplary server machine with operating system support for in-server caching of shared data, in accordance with the present invention.

With reference now to the figures, and in particular with reference to FIG. 1, there is depicted an illustrative collaborative data processing environment (network) including an exemplary server machine 10 with operating system support for in-server caching of shared data, in accordance with the present invention. The network of the illustrative embodiment also includes two client machines 20, which are connected to server machine 10 via communications media 22 (such as twisted-pair cables, coaxial cables, telephone lines, microwave links, and/or radio links). The network may also include one or more intermediate data processing systems, such as an Internet service provider ("ISP") 30.

Figure 2:
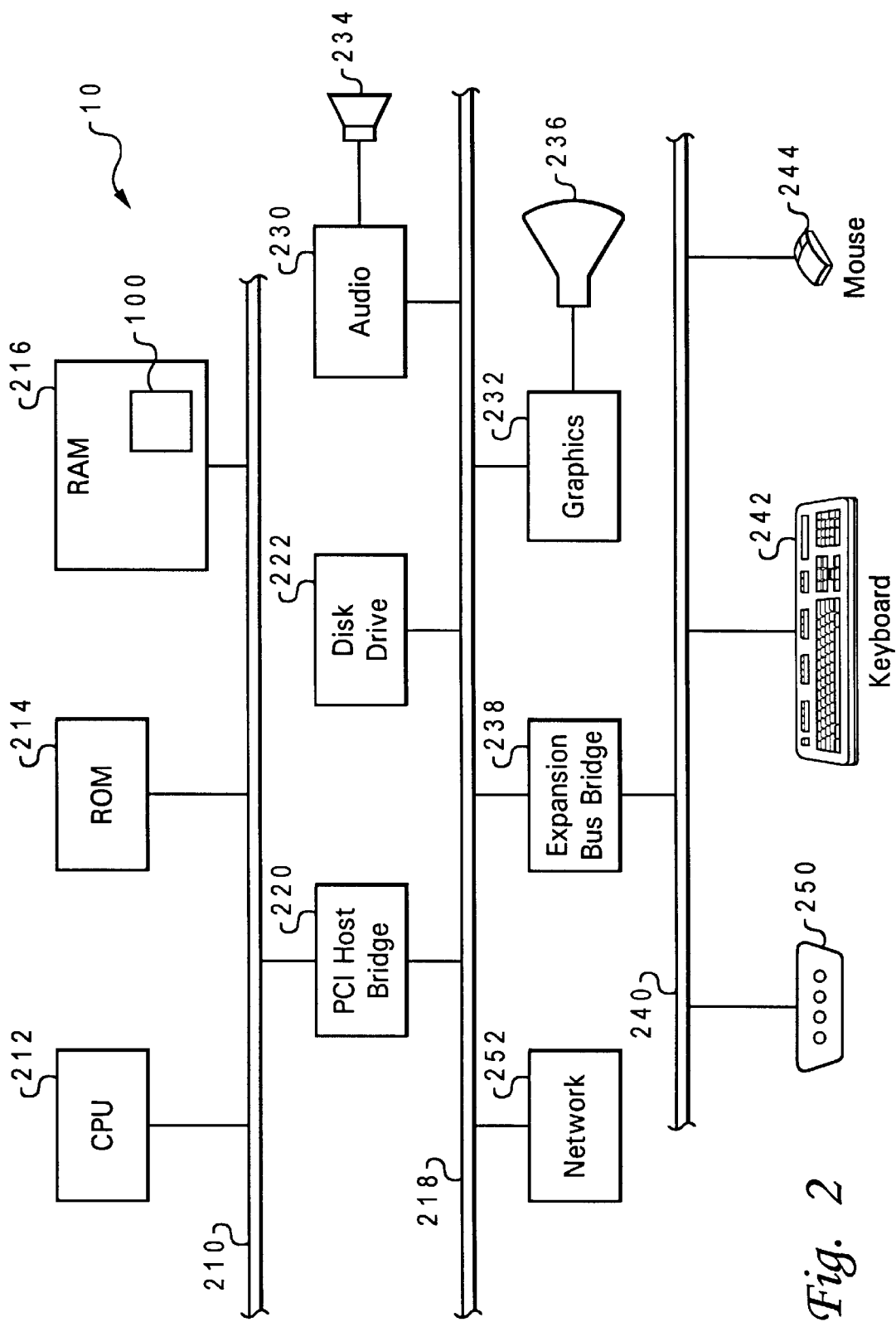
FIG. 2 illustrates a block diagram of the hardware of the server machine of FIG. 1.

Referring now to FIG. 2, there is illustrated a block diagram of the hardware of server machine 10. As shown, server machine 10 includes a system bus 210 that is connected to at least one central processing unit (CPU) 212 and to memory, including read only memory (ROM) 214 and random access memory (RAM) 216. System bus 210 is coupled to a PCI local bus 218 through a PCI host bridge 220. PCI local bus 218 is connected to additional nonvolatile data storage devices, such as one or more disk drives 222, and to an audio adapter 230 and a graphics adapter 232 for controlling audio output through a speaker 234 and visual output through a display device 236, respectively. A PCI-to-ISA bus bridge, such as expansion bus bridge 238, connects PCI local bus 218 to an ISA bus 240, which is attached (through appropriate adapters) to a keyboard 242 and a mouse 244 for receiving operator input.

Also included in server machine 10 are data ports for communicating with external equipment, including other data processing systems such as client machines 20. Those data ports include, without limitation, a serial port 250 attached to ISA bus 240 for linking server machine 10 to remote data processing systems via data communications equipment, such as a modem (not illustrated) or a channel service unit/data service unit (CSU/DSU) (not illustrated). Those data ports may also include a network adapter 252 attached to PCI bus 218 for linking server machine 10 to other stations of a local area network (LAN) (not illustrated).

Server machine 10 also contains programs and data that are stored on the data storage devices, such as disk drive 222. The programs are retrieved from data storage, loaded into RAM 216, and executed by CPU 212 to provide various functions. In particular, in the illustrative embodiment the programs of server machine 10 include a Web server 100 that manages the exchange of information between server machine 10 and client machines 20. In the illustrative embodiment, Web server 100 is generated by a high-level programming language (e.g., C++), which may be compiled or interpreted and accordingly executed on server machine 10.

Figure 3:
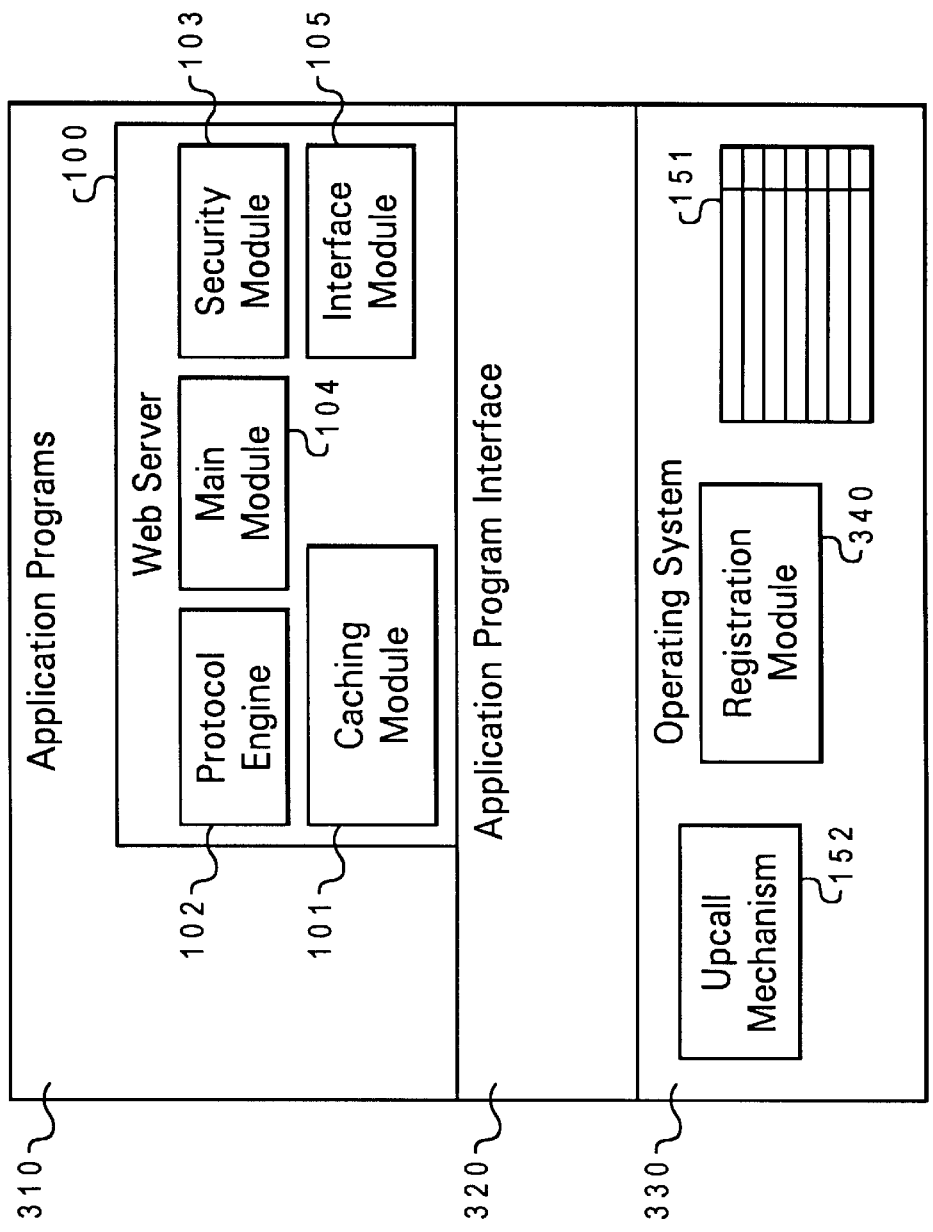
FIG. 3 depicts a layer diagram of the software of the server machine of FIG. 1.

With reference now to FIG. 3, there is depicted a layer diagram of the software of server machine 10. At the highest level of the diagram are the application programs 310, including Web server 100. As illustrated, Web server 100 includes a Hypertext Transfer Protocol (HTTP) engine 102, which manages the connections with remote clients. In particular, protocol engine 102 receives network packets, parses those packets to extract client requests, and interprets the requests.

Web server 100 also includes a main module 104, which works in conjunction with protocol engine 102. Main module 104 controls and manages threads that execute the steps necessary to service client requests. These steps may include retrieving data from the local store (e.g., disk drive 222), as well as performing additional computations with the retrieved data. In addition, main module 104 interacts with a security module 103 to ensure that data processing follows the security policy imposed by the Web site. Security module 103 may contain such components as public key encryption, private key encryption for session protection, the secure socket layer (SSL), and any additional measures that are necessary to define and enforce the required security policy.

After protocol engine 102 receives and interprets a client request, protocol engine 102 passes the request to one of the threads running in main module 104, which then consults with security module 103 to ensure that the request does not violate any of the security policies. If the client request satisfies these policies, main module 104 then communicates with a caching module 101 of Web server 100 to determine whether the result of the request is available in the server cache.

Caching module 101, which is central to the operation of the present invention, allocates a large amount of storage in main memory (i.e., RAM 216) to serve as a server cache for the URL documents that are being served by Web server 100. The server cache is configured to be as large as practicable, but the quest for high performance makes it necessary to engineer the system such that the server cache is always in RAM 216. Additionally, auxiliary information about each document is also cached. Such information may include access permissions, date of last access, data of last modification, among others as may be necessary in a particular Web site configuration.

Caching module 101 also contains a cache directory that lists the URL documents stored in the server cache and the locations of those documents (and the auxiliary information associated with those documents) within the cache to support fast lookups. Additionally, caching module 101 utilizes a variety of conventional data structures and cache management protocols to administer the server cache. For example, caching module 101 may contain a list that orders the URL documents according to time of last access, and caching module 101 may utilize the Least-Recently-Used (LRU) eviction policy to reclaim space when the cache is full. Also, caching module 101 may utilize appropriate hashing functions to quickly find URL documents within the cache.

When communicating with caching module 101, if main module 104 determines that a requested URL document is available in the server cache, main module 104 then simply copies the result from the server cache and hands it to protocol engine 102. Protocol engine 102 then packages the response and sends it to the client in accordance with the Hypertext Transport Protocol (HTTP).

However, if the requested document is not in the server cache, main module 104 utilizes an interface module 105 of Web server 100 to obtain the necessary data and auxiliary information from the local file system. Interface module 105 implements the mechanisms necessary to augment the operation of Web server 100 using external facilities. Such facilities may include Common Gateway Interface (CGI) scripts implemented using standard programming languages, plug-in modules that load into the code of Web server 100, or specific Application Program Interfaces (APIs), such as Netscape's NSAPI. Accordingly, for complex client requests (such as requests involving multiple files) main module 104 may also interact with interface module 105 to gather auxiliary data (such as additional files) and run additional permission checks.

In particular, Web server 100 obtains the necessary data and auxiliary information via calls to the operating system 330 of server machine 10, which is at the lowest level of the layer diagram. Web server 100 then adds the obtained data to the server cache and a corresponding entry to the cache directory according to conventional cache management policies.

In addition, Web server 100 registers with operating system 330 that the document has been added to the server cache. Web server performs this registration by communicating with a registration module 340 that is included within operating system 330. Registration module 340 keeps track of each file that is currently cached in Web server 100. In the illustrative embodiment, operating system 330 includes a registry 151 which contains an entry for each file in server machine 10. Additionally, each entry in registry 151 includes a bit (i.e., a cache bit) that registration module 340 sets to 1 when the cache of Web server 100 contains a copy of that file or clears to 0 when Web server 100 is not caching that file. Registry 151 can be implemented in a variety of ways, as will be appreciated by those skilled in the art. For example, adding one bit to the Index Node (inode) structure within a UNIX®-like file system could provide the necessary support. However, equivalent methods within an operating system for tracking server caching could be used.

Another support mechanism for in-server caching of URL documents provided by operating system 330 is an upcall mechanism 152. As described in greater detail below, operating system 330 uses this mechanism to alert Web server 100 whenever a URL document that is currently cached within Web server 100 is modified (or opened for modification) through the regular file system structure. Upon receiving the upcall, caching module 101 discards the corresponding URL document from the server cache (and the corresponding entry from the cache directory) to ensure that no stale data will be returned to the clients. Additionally, operating system 330 clears the cache bit of that URL document in registry 151 to indicate that the document is no longer cached within Web server 100. The combination of registry 151 and upcall mechanism 152 thus ensure that caching can be deployed within caching module 101 without compromising the quality or correctness of the information within the cache.

Those skilled in the art will appreciate that modern operating systems contain standard support for communication between operating systems and application programs, including communications initiated by the operating system. For example, the upcall may pass from operating system 150 to Web server 100 via an application program interface 320, which is illustrated at the intermediate level of the layer diagram. In particular, the upcall mechanism 152 could be implemented, for example, by means of the signaling facility in UNIX®-like operating systems and their derivatives and by means of message passing in the Windows (Win32) platform.

After generating a result, main module 104 hands the result to protocol engine 102, which transmits the result to the client. This completes the cycle of serving the request. It is important to note that, when a URL document can be found in the server cache, Web server 100 need not contact operating system 330 to obtain the file or its auxiliary information. Server performance therefore improves, due to the elimination of these costly interactions, particularly the context switches associated with examining permissions, checking for auxiliary information, opening the file, and reading it.

Web server 100 uses the operating system support to ensure that the data stored in caching module 101 is always up to date. When Web server 100 accesses the file system to obtain the contents of a URL document and stores that document within the server cache, Web server 100 also registers the document with registration module 340 of operating system 330. Registration module 340 then sets the corresponding bit in registry 151 to indicate that the file is now cached within Web server 100. Additionally, whenever Web server 100 discards a URL document from its cache, Web server 100 unregisters the corresponding document with registration module 340, which then clears the corresponding bit within registry 151 to indicate that the document is no longer cached within Web server 100.

Figure 4:
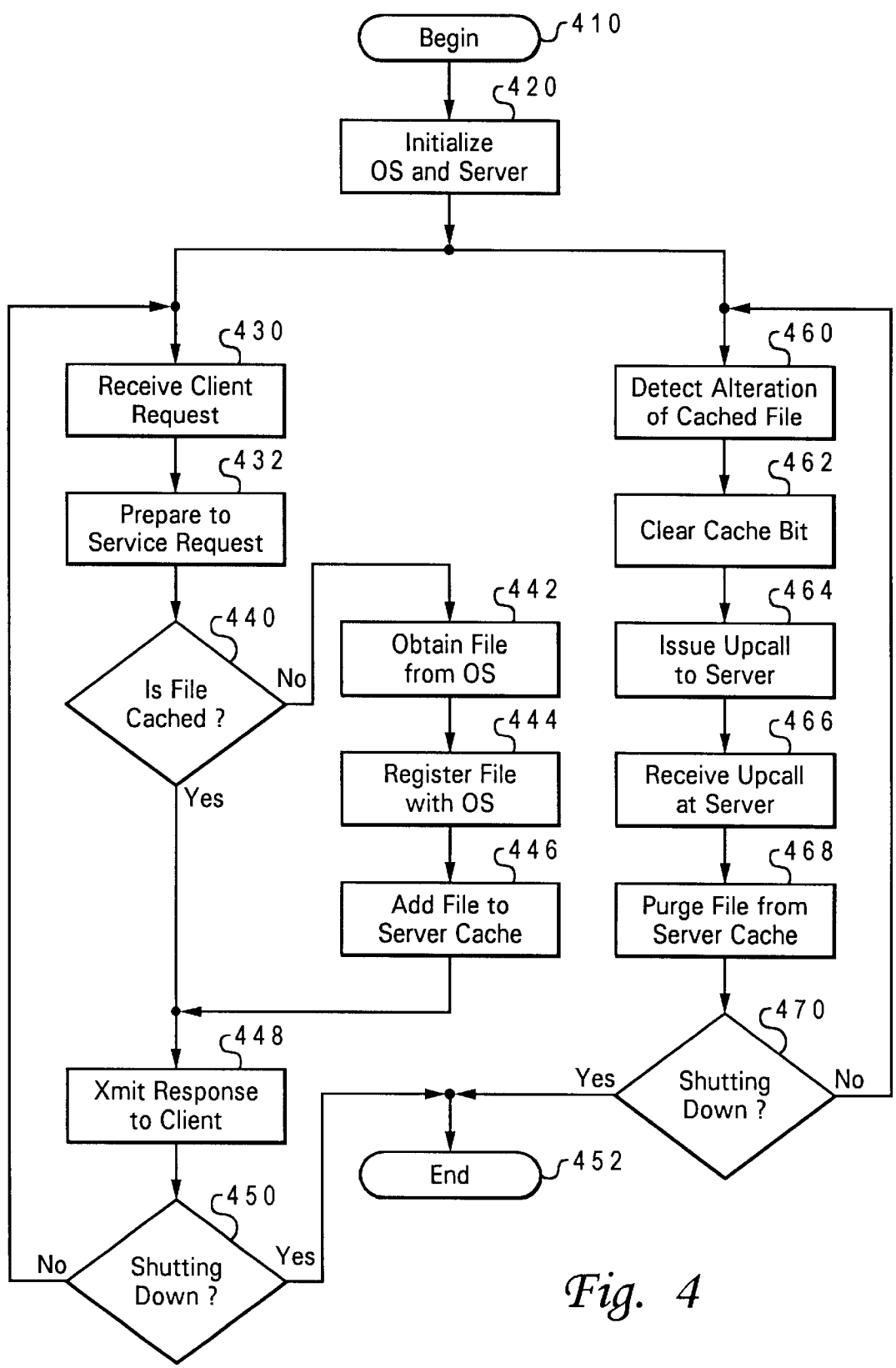
FIG. 4 illustrates a logical flowchart of an exemplary process for utilizing in-server document caching according to the present invention.

Referring now to FIG. 4, there is illustrated a logical flowchart of an exemplary process for providing inserver caching, in accordance with the present invention. It will be appreciated by those skilled in the art that FIG. 4 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. At times, it has proven convenient, to those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind.

The process depicted in FIG. 4 begins at block 410 and then passes to block 420, which illustrates operating system 330 and Web server 100 completing initialization processes (in that order) within server machine 10. Those initialization processes include allocating space in RAM 216 for file system and server caches. The process then diverges into a first loop for receiving and handling client requests and a second loop for maintaining the integrity of the server cache. The first and second loops are executed concurrently and substantially independently.

As illustrated at block 430, the first loop starts with protocol engine 102 receiving a client request from the network and handling the protocol aspects of the request as described above. Protocol engine then passes the request to main module 104, which, as depicted at block 432, prepares to have the request serviced. During this step, main module 104, security module 103, and interface module 105 collaborate to ensure that the request is legal and that it can be executed and to determine what actions are necessary to service the request, as described above in connection with FIG. 3.

As depicted at block 440, main module 104 then consults with caching module 101 to determine if the URL document (or documents) required to service the request is available in the server cache. If the required URL document is not available in the server cache, Web server 100 obtains that URL document from operating system 330, as shown in block 442. Then, after receiving the required URL document, Web server 100 adds the URL document to the server cache within caching module 101 and calls registration module 340 to register the URL document in registry 151 as cached, as shown in blocks 444 and 446, respectively. The process then proceeds to block 448, which illustrates protocol engine 102 receiving the obtained URL document, generate a corresponding response, and transmitting that response to the client.

However, a determination is made at block 440 that the server cache contains the requested URL document (or documents), the process proceeds directly to block 448, which illustrates protocol engine 102 transmitting an appropriate response to the client, as described above. This path (i.e, the path in which Web server 100 obtains URL documents for a request without calling operating system 330) provides the best server performance. Whether the URL document was obtained from operating system 330 or the server cache, once the response has been transmitted, the process returns to block 430 to resume the first loop and thus begin handling the next request, unless an indication that server machine 10 is shutting down is received, as illustrated at block 450, in which case Web server 100 and operating system 330 perform various clean up procedures and the process ends, as shown at block 452.

With reference now to the second loop, as shown at block 460, that loop begins with operating system 330 detecting that the regular file system interface is being utilized to modify one or more of the URL documents that are registered (as cached) within registry 151. In response, operating system 330 clears the corresponding bit in registry 151 to indicate that the subject document is no longer stored within the server cache, as depicted at block 462. Then, as illustrated at block 464, operating system 330 utilizes upcall mechanism 152 to issue an upcall to Web server 100. The upcall includes identification of the URL document(s) that are being modified.

Web server 100 then receives the upcall and identifies the locations within the server cache containing the identified URL document(s), as shown at block 466. Then, as illustrated at block 468, Web server 100 removes those document (s) from the server cache and the corresponding entry or entries from the cache directory so that the stale information is discarded and fresh version(s) will be loaded into the server cache (as described in steps 442–446) if those document(s) are requested again. Next, the process returns to block 460 to resume the second loop to detect subsequent modifications of cached files, unless an indication that server machine 10 is shutting down is received, as illustrated at block 470, in which case Web server 100 and operating 330 perform various clean up procedures and the process ends, as shown at block 452.

As has been described, the present invention improves server performance in client/server networks by providing a server cache that enables data for client requests to be obtained without accessing disk drives or making operating system calls. Further, the invention provides mechanisms for automatically purging outdated data from the cache, including means within the operating system for identifying which files are cached by the server program, as well as an upcall mechanism which the operating system utilizes to alert the server program whenever such a file is modified.

While the invention has been shown and described with reference to an illustrative embodiment, it will be understood by those skilled in the art that various changes in form and detail may be made without departing from the spirit and scope of the invention. For example, although a particular hardware architecture has been utilized to describe an illustrative server machine, those skilled in the art will appreciate that the present invention could as well be implemented in servers with alternative architectures, including, without limitation, programmed or dedicated workstations, minicomputers, and mainframe computers. Furthermore, while the illustrative embodiment has been described with reference to a single server, the present invention may be utilized within multiple servers that cooperate to service client requests, as well.

Also, while the process of servicing client requests has been described as if that process is performed by a single thread of execution within the Web server, it is relatively straightforward to adapt that process to utilize a plurality of threads. These threads could be servicing independent or related client requests simultaneously.

In addition, certain operations of the present invention have been described as being performed by software, particularly by components of a server program and components of an operating system. However, those of ordinary skill in the art will appreciate that some or all of the described operations could be performed alternatively by components that are separate from the server program and the operating system, whether those components are implemented as software, hardware, firmware, or a combination of these.

Furthermore, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for providing in-server caching of shared data, in a server machine having data storage facilities including a random access memory (RAM), said data storage facilities containing multiple data files, said method comprising:

storing a selected file among said multiple data files in a server cache in said RAM, said server cache being controlled by a server program;

if said selected file is modified through a file system interface of an operating system, automatically issuing an upcall from said operating system to said server program, said upcall identifying said selected file as a modified file; and in response to receipt of said upcall, executing a caching module in said server program to remove said modified file from said server cache RAM.

2. A method according to claim 1, further comprising, in response to a request from a remote data processing system, said request requiring access to a required file among said multiple data files:
    obtaining said required file from said server cache RAM if said server cache RAM contains said required file;
    only if said server cache RAM does not contain said required file, calling said operating system to obtain said required file and then adding said required file to said server cache RAM; and
    generating a result based on said required file and transmitting said result to said remote data processing system.

3. A method according to claim 1, further comprising maintaining a registry within file system structures that are maintained by said operating system, said registry indicating which of said multiple data files are in said server cache RAM.

4. A method according to claim 3, wherein:
    said registry contains an entry for each of said multiple data files and each of said entries includes a bit with a value that indicates whether said data file corresponding to said entry is in said server cache RAM; and
    said step of maintaining a registry comprises:
        setting said bit to a first value in response to a determination that said data file corresponding to said entry is in said server cache RAM; and
        setting said bit to a second value in response to a determination that said data file corresponding to said entry is not in said server cache RAM.

5. A method according to claim 3, wherein said step of automatically executing an upcall mechanism of said operating system comprises:
    examining said registry when one or more of said multiple data files are changed to identify which of said changed files are in said server cache RAM; and
    modifying said registry to indicate that said identified files are not in said server cache RAM.

6. A server machine with facilities for in-server caching of shared data, said server machine comprising:
    data storage facilities including a random access memory (RAM), said data storage facilities containing multiple data files;
    processing resources in communication with said data storage facilities;
    a server program, stored in said RAM, that executes on said processing resources, that defines a portion of said RAM as a server cache RAM, that controls said server cache RAM, and that stores a selected file among said multiple data files in said server cache RAM;
    an operating system, stored in said RAM, that executes on said processing resources, that provides a file system interface for accessing said multiple data files, and that issues an upcall to said server program if said selected file is modified through said file system interface, said upcall identifying said selected file as a modified file; and
    a caching module in said server program that responds to receipt of said upcall by removing said modified file from said server cache RAM.

7. A server machine according to claim 6, wherein said server program comprises:
    a main module that, responsive to receipt of a request from a remote data processing system, said request requiring access to a required file among said multiple data files:
        if said server cache RAM contains said required file, obtains said required file from said server cache RAM; and
        only if said server cache RAM does not contain said required file, calls said operating system to obtain said required file and then adds said required file to said server cache RAM; and
        generates a result based on said required file and transmits said result to said remote data processing system.

8. A server machine according to claim 6, wherein said operating system also maintains file system structures including a registry that indicates which of said multiple data files are in said server cache RAM.

9. A server machine according to claim 8, wherein:
    said registry contains an entry for each of said multiple data files; and
    each of said entries includes a bit with a value that indicates whether said data file corresponding to said entry is in said server cache RAM.

10. A server machine according to claim 8, wherein:
    said operating system examines said registry when one or more of said multiple data files is changed to identify which of said changed files are in said server cache RAM; and
    in conjunction with issuing said upcall, said operating system modifies said registry to indicate that said identified files are not in said server cache RAM.

11. A program product for providing in-server caching of shared data in a server machine having data storage facilities including a random access memory (RAM), said data storage facilities containing multiple data files, said program product comprising:
    a server program that defines a portion of said RAM as a server cache, that controls said server cache RAM, and that stores a selected file among said multiple data files in said server cache RAM;
    at least part of an operating system of said server machine, wherein said at least part causes said operating system to issue an upcall to said server program if said selected file is modified through a file system interface of said operating system, said upcall identifying said selected file as a modified file;
    a caching module in said server program that responds to receipt of said upcall by removing said modified file from said server cache RAM; and
    a computer usable medium encoding said server program and said at least part.

12. A program product according to claim 11, wherein said server program comprises:
    a main module that, responsive to receipt of a request from a remote data processing system, said request requiring access to a required file among said multiple data files:
        if said server cache RAM contains said required file, obtains said required file from said server cache RAM; and
        only if said server cache RAM does not contain said required file, calls said operating system to obtain said required file and then adds said required file to said server cache RAM; and
        generates a result based on said required file and transmits said result to said remote data processing system.

13. A program product according to claim 11, wherein said at least part causes said operating system to maintain a registry within file system structures of said operating system, said registry indicating which of said multiple data files are in said server cache RAM.

14. A program product according to claim 13, wherein:

said registry contains an entry for each of said multiple data files; and each of said entries includes a bit with a value that indicates whether said data file corresponding to said entry is in said server cache RAM.

15. A program product according to claim 12, wherein:

said at least part causes said operating system to examine said registry when one or more of said multiple data files is changed to identify which of said changed files are in said server cache RAM; and said at least part causes said operating system, in conjunction with issuing said upcall, to modify said registry to indicate that said identified files are not in said server cache RAM.

* * * * *